United States Patent

Beaudoux

[15] 3,704,627
[45] Dec. 5, 1972

[54] SUGAR CAN SAMPLER
[72] Inventor: Pierre Emile Beaudoux, 23 avenue du Chateau, 76 Dieppe, France
[22] Filed: Aug. 30, 1971
[21] Appl. No.: 176,188

[30] Foreign Application Priority Data

Sept. 2, 1970 France..................................7031882

[52] U.S. Cl..................................73/423 R, 73/424
[51] Int. Cl................................................G01n 1/08
[58] Field of Search .....73/421 R, 423 R, 424, 425.2; 175/40, 19, 20, 58

[56] References Cited

UNITED STATES PATENTS 2,459,383  1/1949  Levy..................................73/421 R
2,709,368  5/1955  Wolpert..............................73/421 R Primary Examiner—S. Clement Swisher
Attorney—Irvin S. Thompson and Robert J. Patch

[57] ABSTRACT

Sugar cane sampler comprising a probe composed of a hollow cylinder with a mouth in the form of a cylindrical saw blade mounted so as to rotate around its axis on a probe chassis and an ejector ram mounted so as to slide in the said cylinder, as well as a guide chassis on which the probe chassis is mounted so as to slide parallel to the axis of the probe and a selective connecting drive to give an advance or reverse movement parallel to the said axis, either to the assembly consisting of the cylinder and ram or to the ram alone, the drive being in the form of a jack, the casing of which is fixed to the guide chassis and the piston of which is directly connected by its rod to the ejector ram.

15 Claims, 5 Drawing Figures

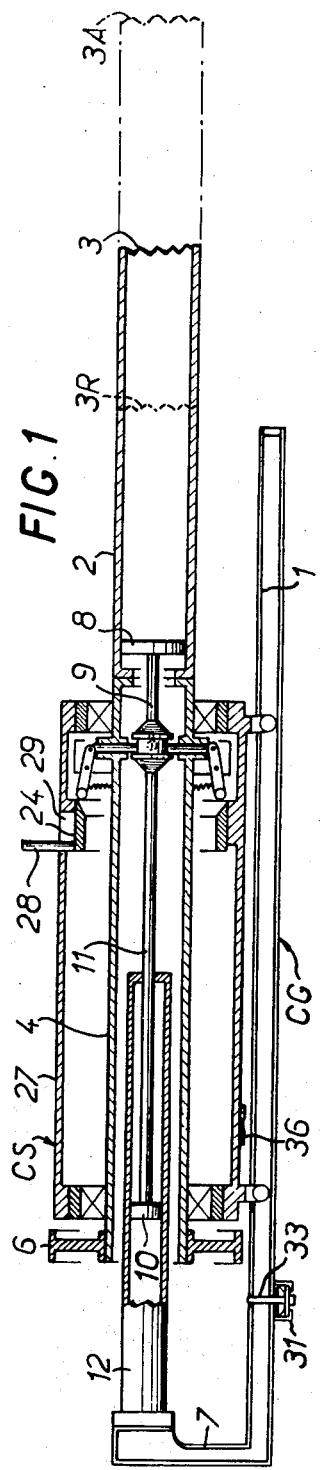
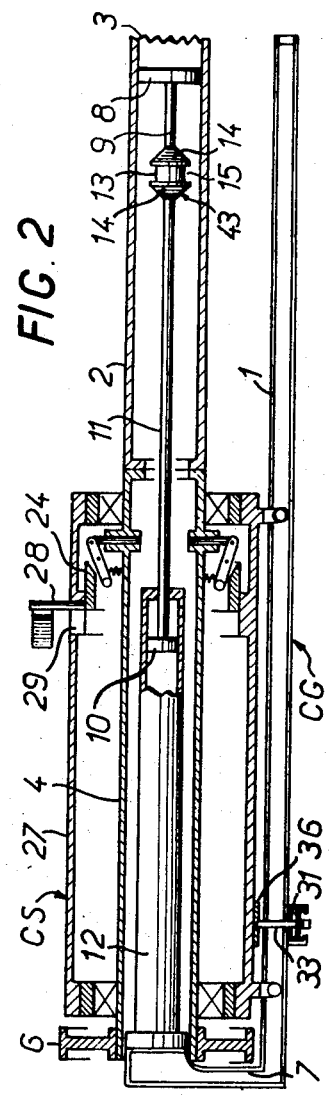
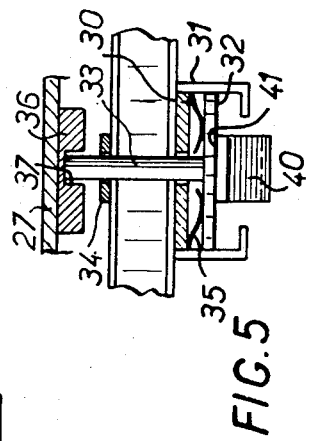
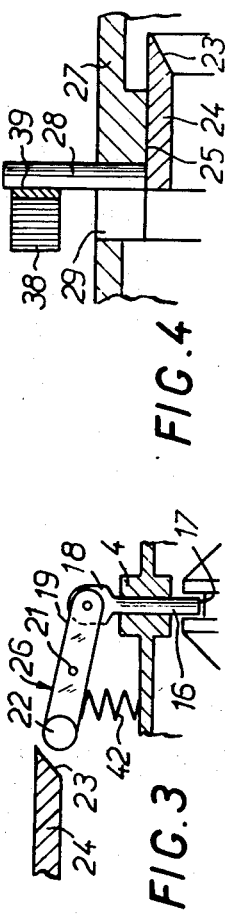
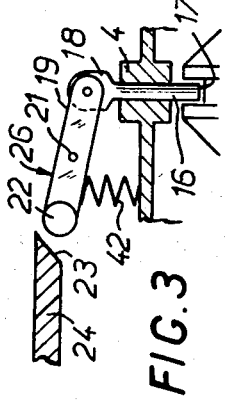

3,704,627

SUGAR CAN SAMPLER

BACKGROUND OF THE INVENTION

1. Field of the Invention

The present invention relates to a sampler for use in sampling sugar cane.

2. Description of the Prior Art

Devices for sampling sugar cane, comprise a probe consisting of a hollow cylinder with a mouth in the form of a cylindrical saw-blade, mounted so as to rotate on a probe chassis which can move parallel to the axis of the cylinder along a guide chassis, a sample ejector ram housed in the cylinder, which is fixed by its rod to an advance chassis which is also capable of moving parallel to the axis of the cylinder on the guide chassis as a result of the action of a jack drive, the fixed part or casing of which is rigidly connected with the guide chassis, means being provided for making the probe chassis integral as desired with the advance chassis or with the guide chassis, and able in this way to move axially, either the whole of the probe, cylinder and ram, so as to drill into the mass to be sampled and to take a sample from it, or the ram alone, so as to eject the sample which has been taken.

The aim of the present invention is to simplify this device and inter alia to decrease its overall dimensions considerably without damaging its function or its possibilities.

SUMMARY

According to the invention a sampler comprises a probe in the form of a hollow cylinder, a cylindrical saw blade mouth at one end of said cylinder, a probe chassis on which said probe is rotatably mounted, a guide chassis on which said probe chassis is mounted so as to move thereon parallel to the probe axis, an ejector ram slidably mounted in said probe cylinder, and a selective connecting drive to move selectively said ram alone and the ram and probe assembly in advance and reverse directions, said drive comprising a jack the cylinder of which is fixed to said guide chassis and the piston rod of which is connected directly to said ejector ram.

Such a sampler eliminates the advance chassis and causes the jack control to act directly on the ejector ram, an element of this drive being adapted so that it can be connected selectively in axial movement with the cylinder of the probe so as to be able to act as desired on the whole of the probe or only on the ejector ram.

According to one mode of execution of this device, the selective connection between the jack drive and the probe cylinder is located on a rear prolongation of the cylinder, which facilitates the maintenance on this of an external smooth and uniform surface which is suitable for favoring the penetration into the mass to be sampled.

According to one application, the piston of the jack drive and the ejector ram are mounted on a common rod, formed of a single support or composed of two sections rigidly coupled end to end, the probe cylinder being driven to rotate by a hollow shaft which surrounds the rod and in which the casing of the jack is housed, the wall of the hollow shaft being crossed by at least one engaging pin controlled by a lever so as to be able to penetrate as desired into a hollow formed in the rod.

Advantageously the control lever or levers of the engaging pins are actuated by a cylindrical abutment consisting of the bevelled edge of a sleeve surrounding the hollow shaft and mounted so as to slide axially inside the probe chassis.

Advantageously a stop is adapted to act on the control levers and automatically free the jack drive of the probe cylinder by simply bringing the device to an ejector position, restoring springs acting on these levers so as to re-engage the jack drive with the probe cylinder as soon as the sampler leaves this ejector position.

The objects, characteristics and advantages of the invention will appear from the description which will be given below, which deals with a selected form of execution by way of example and is represented in the attached drawings.

BRIEF DESCRIPTION OF THE DRAWINGS

FIG. 1 shows, in a vertical axial section, a device according to the invention in the sampling position;

FIG. 2 shows this device in a similar view when it is in the position for ejecting the sample, and FIGS. 3 to 5 are detail views.

DESCRIPTION OF THE PREFERRED EMBODIMENTS

According to the example chosen and shown in the drawings, a probe cylinder 2, with a horizontal axis and the mouth 3 of which has the form of a circumferential saw blade, is prolonged towards the rear, that is to say at the end opposite to the mouth 3, by a coaxial hollow shaft 4, to which it is rigidly fixed. The shaft 4, mounted so as to rotate in a probe chassis CS by means of ball bearings, is equipped at its rear end with a drive pulley 6 coupled with an electric motor which is not shown in the drawing.

A sample ejector ram 8, mounted so as to slide in the cylinder 2, is fixed to the end of a drive rod 9.

The chassis CS, in the form of a cylindrical casing, is mounted so as to slide parallel to the axis of the probe in a guide track 1 formed on a guide chassis CG.

The guide chassis CG terminates at the rear in a vertical elbow bend pointing upwards, which carries at its top end the casing 12 of a jack with a horizontal axis situated above the guide track 1 and housed inside the hollow shaft 4. The piston 10 of the jack, mounted so as to slide in the casing 12, actuates a rod 11 situated in the prolongation of the rod 9 and coupled with it by means of a sleeve 13. The sleeve 13 is framed by two collars 14 and with them forms a circular groove 15.

Engaging pins 16, which can slide radially backwards and forwards through the cylindrical wall of the hollow shaft 4, are adapted so that they penetrate with their inner end 17 into the annular groove 15, and they are articulated at their opposite end 18 to the end 19 of a lever 26 mounted so as to swivel at an intermediate point on a pivot 21 which is integral with the shaft 4. Restoring springs 42 act on the levers 26 in the direction required to cause the engaging pins 16 to engage with the groove 15.

The other end 22 of each lever is located opposite a truncated conical surface 23, sloping forward from the rear, and consisting of a bevel on the front edge of a clutch tooth 24, which is capable of sliding horizontally on a cylindrical surface 25 formed to project from the inner surface 27 of the casing 27 which forms part of the guide chassis CG.

The tooth 24 is equipped with a stop 28 which projects beyond the outer surface of the casing 27 through an aperture 29 arranged in the wall of the latter. The axial length of the aperture is greater than the axial dimension of the foot, which makes it possible for the tooth to move along the horizontal axis of the device.

The chassis CG has on its lower surface a plate 30 equipped with feet 31 made so as to hang downwards, on the bent ends of which there rests freely a plate 32. The plate 32 is equipped on its upper surface with a vertical rod 33, guided vertically by a passage hole arranged in the plate 30 and by a washer 34 fixed to the chassis CG. Restoring springs 35 arranged between the plates 30 and 32 maintain the latter in the lower position, as shown in FIG. 1. On the other hand, a plate 36, fixed to the bottom of the casing 28, possesses a blind hole 37 on its lower surface.

FIG. 1 shows the apparatus in the sampling position. The engaging pins 16 are engaged with the groove 15, which has the effect of locking the piston 10 of the control jack both with the ejector ram 8 and the hollow shaft 4 fixed to the probe cylinder 2. The ejector ram 8 is located at the rear limit stop inside the probe cylinder 2, and the jack may act jointly with the rotary drive of the cylinder 2 so as to force the whole of the probe assembly into the mass to be sampled until the mouth 3 reaches the position 3A of the front limit stop, so as to cause the probe to move back, together with the sample which it has taken, as far as the position 3R of the rear limit stop.

A two-position switch or similar device, not shown in the drawing, fixed to the guide chassis CG, comes into action and turns the probe cylinder as soon as the probe chassis advances from its position at the rear stop, and stops the rotation when the probe chassis regains this position.

The guide chassis CG then moves together with the whole of the apparatus, using known means, transversely in relation to the axis of the probe, so as to arrive at an ejection position (FIG. 2). At this position there is a fixed abutment 38, the front face 39 of which progresses forward in an axial direction, in the direction of movement of the apparatus towards the ejection position. The upper surface 41 of another fixed abutment 40 progresses upwards, always in the direction of movement of the apparatus towards the ejection position. When the apparatus reaches its transverse limit stop so as to take up the position represented in FIG. 2, the abutment 38 acts on the stop 28 and pushes the sleeve 24 axially towards the front, which has the effect of releasing the probe cylinder 2 from the piston 10 of the drive jack. Furthermore the abutment 40 acts on the plate 31 and pushes the rod 33 upwards, against the action of the springs 35. The rod 33 penetrates into the blind hole 37, which has the effect of blocking axially on the guide chassis CG the probe chassis CS and consequently the probe cylinder 2. While the probe cylinder is immobilized, the drive by jack may move the single ram 8 forward so as to eject the sample which has been taken.

When the apparatus leaves the ejector position as a result of the reverse transverse movement, the restoring springs 42 replace the pins 16 in the engaged position, which has the effect of pushing the clutch tooth 24 towards the rear, by sliding the ends 22 of the levers 26 along the abutment 23. The inner ends of these pins slide along the truncated conical surface 43 of one or other of the collars 14 so as to come back into engagement with the groove 15, by an axial movement of the rod 9, 11 in one direction or the other. On the other hand, the plate 32, after leaving the abutment 40, is brought back towards the bottom by the springs 35 and the probe chassis CS regains its liberty of axial movement in relation to the guide chassis, CG. The apparatus is then in a position to take another sample.

I claim:

1. A sugar cane sampler comprising a probe in the form of a hollow cylinder, a cylindrical saw blade mouth at one end of said cylinder, a probe chassis on which said probe is rotatably mounted, a guide chassis on which said probe chassis is mounted so as to move thereon parallel to the probe axis, an ejector ram slidably mounted in said probe cylinder, and a selective connecting drive to move selectively said ram alone and the ram and probe assembly in advance and reverse directions, said drive comprising a jack the cylinder of which is fixed to said guide chassis and the piston rod of which is connected directly to said ejector ram.

2. A sampler according to claim 1, wherein said selective connecting drive connects the jack piston rod to an element fixed to the rear of said probe cylinder.

3. A sampler according to claim 1, wherein a restoring device is provided acting on said selective connecting drive in the required direction so as to connect solidly said jack piston rod axially with said probe cylinder.

4. A sampler according to claim 1, wherein said jack cylinder is housed in a hollow shaft, bringing said probe cylinder into rotation and forming a prolongation to the rear of said cylinder.

5. A sampler according to claim 1, wherein said jack casing is fixed to an arm which forms an elbow directed upwards at the rear end of said guide chassis.

6. A sampler according to claim 1, wherein said selective connection drive comprises at least one engaging pin which passes radially through the wall of said jack cylinder in the form of a hollow shaft and slides therefor, the radially interior end of said pin being capable of engaging selectively with a hollow formed on said piston rod.

7. A sampler according to claim 6, wherein said hollow is an annular groove bounded by two collars, each of which presents on the side opposite said groove a truncated conical face which diverges towards said groove and constitutes an attacking and sliding face for the radially internal end of said engaging pin.

8. A sampler according to claim 6, wherein said engaging pin is articulated by its radially external end to a lever mounted so as to swivel at an intermediate point on a pivot which is integral with said hollow shaft, the opposite end of said lever being arranged to face an inclined abutment on the axis of said hollow shaft and capable of moving along this axis in relation to said engaging pin, the sliding of the said end opposite to said lever on said abutment accompanying the axial displacement of said abutment to move said engaging pin away from said rod and to move it towards said rod.

9. A sampler according to claim 8, wherein said abutment is a truncated conical surface formed by a bevelled edge on a sleeve mounted to slide in a cylindrical mounting inside said probe chassis.

10. A sampler according to claim 8, wherein said abutment is a truncated conical surface formed by a bevelled edge on a sleeve mounted to slide in a cylindrical mounting inside said probe chassis, said sleeve having a stop which projects over the outer surface of said probe chassis.

11. A sampler according to claim 8, wherein an inclined surface is fixed in a sample ejection position and adapted to come into gradual contact with a stop when a transverse displacement of said sampler towards the said position takes place, to displace said sleeve in relation to said engaging pin in the direction required to make it come out of said hollow and liberate axially said jack rod of said probe cylinder.

12. A sampler according to claim 8, wherein locking means are provided capable of selectively preventing the axial displacement of said probe chassis along said guide chassis.

13. A sampler according to claim 8, wherein a device is fixed in a sample ejection position adapted to act on the locking means during the transverse displacement of said sampler towards said position, in the desired direction to bring into action the said locking device.

14. A sampler according to claim 8, wherein a restoring device is provided acting on locking means for preventing movement of said probe chassis in a direction required to render said locking means inoperative.

15. A sampler according to claim 8, wherein a switch is fixed to said guide chassis and adapted to come into action to cause said probe cylinder to rotate when said probe cylinder advances from its position at said rear limit stop and to stop this rotation when said probe chassis regains this position.

* * * * *